United States Patent [19]
Winker et al.

[11] Patent Number: 5,557,434
[45] Date of Patent: Sep. 17, 1996

[54] OPTICAL COMPENSATOR INCLUDING AN O-PLATE FOR SUPER-TWIST NEMATIC LIQUID CRYSTAL DISPLAY

[75] Inventors: Bruce K. Winker, Moorpark; Ragini Saxena, Simi Valley; Donald B. Taber, Thousand Oaks; Leonard G. Hale, Newbury Park, all of Calif.

[73] Assignee: Rockwell International, Seal Beach, Calif.

[21] Appl. No.: 313,477

[22] Filed: Sep. 30, 1994

[51] Int. Cl.$^6$ .................... G02F 1/1335; C09K 19/02
[52] U.S. Cl. ........................................ 359/73; 359/102
[58] Field of Search ............................. 359/73, 102

[56] References Cited

U.S. PATENT DOCUMENTS

| | | | |
|---|---|---|---|
| 4,701,028 | 10/1987 | Clerc et al. | 359/73 |
| 5,058,998 | 10/1991 | Yoshida et al. | 359/77 |
| 5,184,237 | 2/1993 | Iimura et al. | 359/63 |
| 5,196,953 | 3/1993 | Yeh et al. | 359/73 |
| 5,249,071 | 9/1993 | Yoshimizu et al. | 359/73 |
| 5,291,322 | 3/1994 | Itoh et al. | 359/73 |
| 5,296,955 | 3/1994 | Tsujioka | 359/73 |
| 5,311,340 | 5/1994 | Murata et al. | 359/73 |
| 5,375,006 | 12/1994 | Haas | 359/73 |

FOREIGN PATENT DOCUMENTS

| | | |
|---|---|---|
| 0576304 | 12/1993 | European Pat. Off. . |
| 0576342 | 12/1993 | European Pat. Off. . |
| 0576931 | 1/1994 | European Pat. Off. . |
| 5-157913 | 6/1993 | Japan ........................ 359/73 |

OTHER PUBLICATIONS

Moia et al., "High–Contrast and High–Information–Content Optical–Mode–Interference (OMI) LCD with Video Response: Comparison with STN–LCDs," SID 93 Digest, Seattle., U.S.A., pp. 368–371, 1993.

Scheffer et al., "Liquid Crystals Applications and Uses," vol. 1, B. Bahadur, ed., World Scientific, pp. 231–274, 1990.

"Electrooptic Effects in Liquid Crystal Materials," Blinov and Chigrinov, Springer–Verlag, 1994.

*Primary Examiner*—William L. Sikes
*Assistant Examiner*—Ron Trice
*Attorney, Agent, or Firm*—Gregory G. Williams; M. Lee Murrah; G. A. Montanye

[57] ABSTRACT

An improved normally white super-twist nematic (OMI) liquid crystal display exhibits a dramatically improved horizontal viewing angle as compared to conventional OMI displays. The display's liquid crystal cell has a twist angle greater than about 180° and less than about 270°, preferably between 220° and 250°, and a phase retardation of between 500 nanometers (nm) and 850 nm. The improved display includes a novel compensator which incorporates, as one of its compensation elements, a positively birefringent oblique compensator layer (referred to as an O-plate compensator layer). Additionally, a positively birefringent A-plate compensator layer and one or more negatively birefringent C-plate compensator layers may be used in the display.

16 Claims, 11 Drawing Sheets

OPTICAL COMPENSATOR INCLUDING AN O-PLATE FOR SUPER-TWIST NEMATIC LIQUID CRYSTAL DISPLAY

REFERENCE

U.S. Pat No. 5,196,953 and co-pending U.S. patent application "Inorganic Thin Film Compensator For Improved Gray Scale Performance in Twisted Nematic Liquid Crystal Displays" by William J. Gunning, III, Bruce K. Winker, Donald B. Taber, Paul H. Kobrin, James C. Beedy, and John P. Eblen, Jr., Ser. No. 08/313,510, are hereby incorporated by reference. U.S. Pat. No. 5,196,953 and the cited co-pending applications are commonly assigned with this application.

BACKGROUND OF THE INVENTION

The invention relates to an improved passive super-twist nematic (STN) liquid crystal display (LCD) and, in particular, to normally white LCDs (referred to as optical mode interference or OMI displays). This is in contrast to the colloquial use of the term "film-compensated STN" or "FSTN" which refers to a type of normally black super-twist nematic liquid crystal display. Super-twist nematic liquid crystal displays are well-known in the art as described in, e.g., Scheffer and Nehring, Vol. 1, B. Bahadur, ed., World Scientific, pp. 231-274, 1990.

Both OMI and FSTN displays are examples of comparatively low-cost displays that can be driven by passive, i.e., multiplexed, addressing techniques (in contrast to the well-known active-matrix type of liquid crystal display).

2.1 Some Advantages and Disadvantages of OMI Displays

It is well-known in the art that an OMI display has an inherently wider operational temperature range than does a FSTN, e.g., Moia et al., "High-Contrast and High-Information-Content Optical-Mode-Interference (OMI) LCD with Video Response: Comparison with STN-LCDs," SID 93 Digest, Seattle, pp. 368–371, 1993. A wide operational temperature range is important in many applications, e.g., automobile dashboards, avionics system displays, hand-held portable electronic devices, and automated-controller applications such as gasoline pumps, manufacturing process controllers, and the like. It has also been reported that OMI displays exhibit faster on and off response times than do FSTN displays, e.g., see Moia et al.

A substantial drawback of conventional OMI displays, however, is that the display's viewing angle in the horizontal direction is too narrow for many applications in which a high operating-temperature range is desired. Also, a chromaticity of the white and black states varies with viewing angle and temperature.

2.2 O-Plate Compensation Technology

To improve the field of view and chromaticity stability, a birefringent O-plate compensator can be used. The O-plate compensator principle, as described in U.S. patent application Ser. No. 223,251 utilizes a positive birefringent material with its principal optic axis oriented at a substantially oblique angle with respect to the plane of the display (hence the term "O-plate"). "Substantially oblique" implies an angle appreciably greater than 0° and less than 90°. O-plates have been utilized, for example, with angles relative to the plane of the display between 30° and 60°, typically at 45°. Moreover, O-plates with either uniaxial or biaxial materials can be used. O-plate compensators can be placed in a variety of locations between a LCD's polarizer layer and analyzer layer.

In general, O-plate compensators may also include A-plates and/or negative C-plates as well as O-plates. As is well known in the art, an A-plate is a birefringent layer with its extraordinary axis (i.e., its c-axis) oriented parallel to the surface of the layer. Its a-axis is thus oriented normal to the surface (parallel to the direction of normally incident light), leading to its designation as an A-plate. A-plates may be fabricated by the use of uniaxially stretched polymer films, such as polyvinyl alcohol, or other suitably oriented organic birefringent materials.

A C-plate is a uniaxial birefringent layer with its extraordinary axis oriented perpendicular to the surface of the layer (parallel to the direction of normally incident light). Negatively birefringent C-plates may be fabricated by the use of uniaxially compressed polymers (See, e.g., Clerc et al., U.S. Pat. No. 4,701,028), stretched polymer films, or by the use of physical vapor deposited inorganic thin films (See, e.g., Yeh, et al., U.S. Pat. No. 5,196,953), for example.

SUMMARY OF THE INVENTION

An improved normally white super-twist nematic (OMI) liquid crystal display exhibits a dramatically improved horizontal viewing angle as compared to conventional OMI displays. The display's liquid crystal cell has a twist angle greater than 180° and less than 270°; preferably between 220° and 250° and a phase retardation of between 500 nanometers (nm) and 850 nm. The improved display includes a novel compensator which incorporates, as one of its compensation elements, a positively birefringent oblique compensator layer (referred to as an O-plate compensator layer). Additionally, a positively birefringent A-plate compensator layer and one or more negatively birefringent C-plate compensator layers may be used in the display.

DETAILED DESCRIPTION OF SPECIFIC EMBODIMENTS

Figure 1:
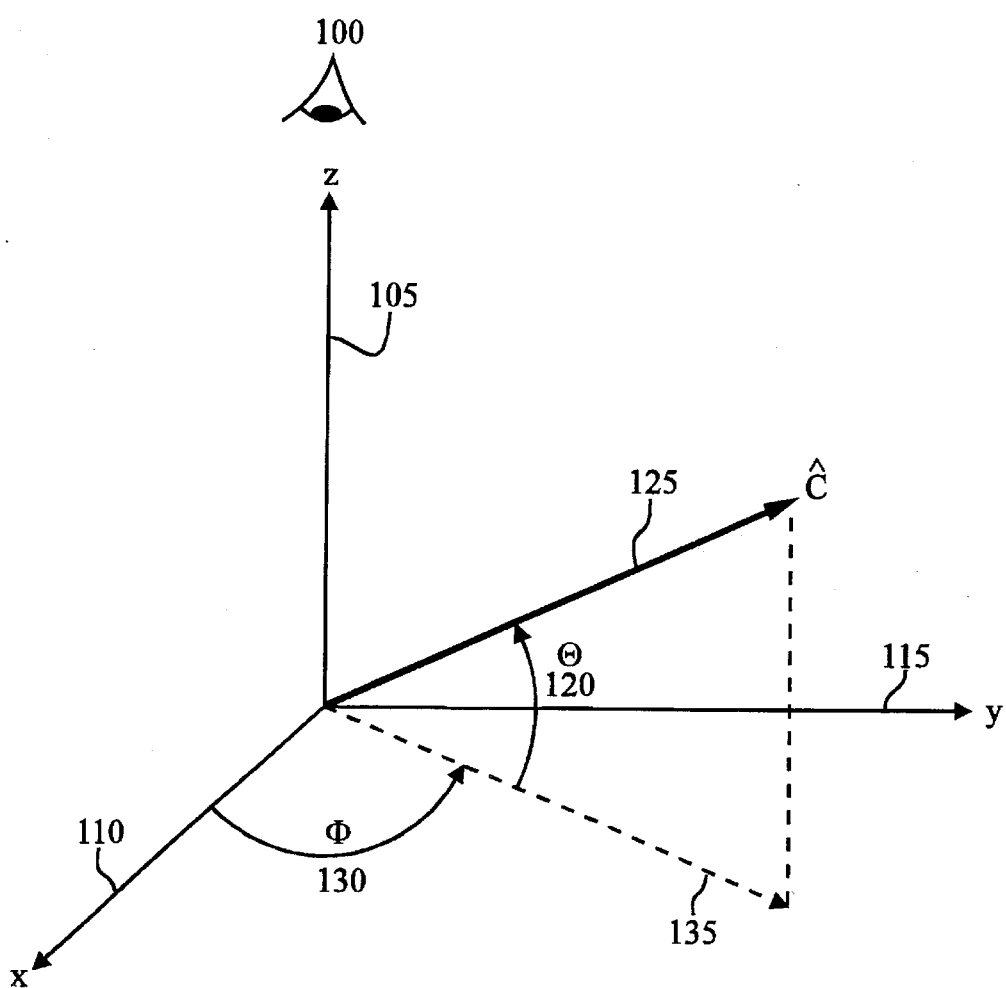
FIG. 1 depicts the coordinate system used to describe the orientation of certain aspects of the invention.

The overall effect of introducing one or more O-plate compensator layers into a liquid crystal display in accordance with the invention is to (1) increase the viewing angle in the display's horizontal direction without adversely affecting its viewing angle in the vertical direction, (2) reduce the variation in chromaticity over the field of view, and (3) to allow a display using the inventive compensation to operate over a wider temperature range than conventionally possible. Orientations of the compensator optic axes are carefully chosen so that the combined retardation effects cancel each other in the normal incidence viewing direction and produce a normally white display. Combinations of O-plates and A-plates can be used as long as their orientations satisfy these requirements. Furthermore, negative C-plates can, for certain configurations, increase the contrast ratio at large horizontal fields of view.

The liquid crystal layer, the compensator layers, and the polarizer and analyzer layers may assume a variety of orientations relative to one another in implementing embodiments of the invention using oblique retarders (O-plates). Some of the possible configurations using inorganic and organic O-plates which have been considered are set out in Table I and Table II respectively. In Tables I and II, A represents an A-plate, C represents a negative birefringent C-plate, O represents an O-plate, LC represents the liquid crystal, and OxO represents crossed O-plates. Crossed O-plates are adjacent O-plates with their azimuth angles Φ (see FIG. 1) nominally crossed at approximately 90°.

TABLE 1

Liquid Crystal Display Using Inorganic O-Plates

←Toward Rear (Polarizer Side) Toward Front (Analyzer Side)→

| | | | | | |
|---|---|---|---|---|---|
| | C | LC | C | A | O |
| | C | LC | A | O | |

TABLE II

Liquid Crystal Display Using Organic O-Plates

←Toward Rear (Polarizer Side) Toward Front (Analyzer Side)→

| | | | | | | |
|---|---|---|---|---|---|---|
| | OxO | C | LC | C | OxO | |
| O | A | C | LC | C | A | O |
| | O | C | LC | C | O | |
| | A | O | LC | O | A | |

The flexibility which the oblique compensation scheme of the instant invention offers the display engineer allows tailoring of performance to specific display product requirements. It is possible, for example, with simple configuration and parameter modifications to achieve isocontrast optimized for left or right viewing. Furthermore, a negatively birefringent A-plate may be substituted for a positive A plate. In this case, the negatively birefringent A-plate would be oriented with its extraordinary axis perpendicular to the orientation appropriate for a positively birefringent A-plate. Additional changes would also be required in the other components of the compensator to optimize performance when a negative A-plate is used.

Preferred embodiments of the instant invention are illustrated and described above as they might be implemented using normally white super-twist liquid crystal display technology. In the interest of clarity, not all features of an actual implementation are described in this specification. It will of course be appreciated that in the development of any such actual implementation (as in any development project), numerous implementation-specific decisions must be made to achieve the developers' specific goals and sub-goals, such as compliance with system- and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

It is recognized that modifications and additional embodiments will undoubtedly be apparent to those skilled in the art. For example, another possible embodiment would utilize the compensator layers as one or more of the substrates in the display structure. The instant invention is applicable as well to color displays, in which color filters are associated with the arrays of electrodes in the display. Furthermore, equivalent elements may be substituted for those illustrated and described herein, parts or connections might be reversed or otherwise interchanged, and certain features of the invention may be utilized independently of other features. In addition, conventional details of a liquid crystal display, such as electrodes, color filters, planarization layers and the like are not presented because such details are well known in the art of liquid crystal displays. Consequently, the exemplary embodiments should be considered illustrative, rather than inclusive, while the appended claims are more indicative of the full scope of the invention.

FIG. 1 depicts the coordinate system which is used to describe the orientation of both liquid crystal and birefringent compensator optic axes in the discussion below. Light propagates toward the viewer 100 in the positive z direction 105 which, together with the x-axis 110 and the y-axis 115, form a right-handed coordinate system. The polar tilt angle Θ 120 is defined as the angle between the molecular optic axis ĉ 125 and the x-y plane, measured from the x-y plane. The azimuthal or twist angle Φ 130 is measured from the x-axis to the projection 135 of the optic axis onto the x-y plane.

5.1 Structure of a Specific Embodiment Using an Inorganic O-Plate

Figure 2:
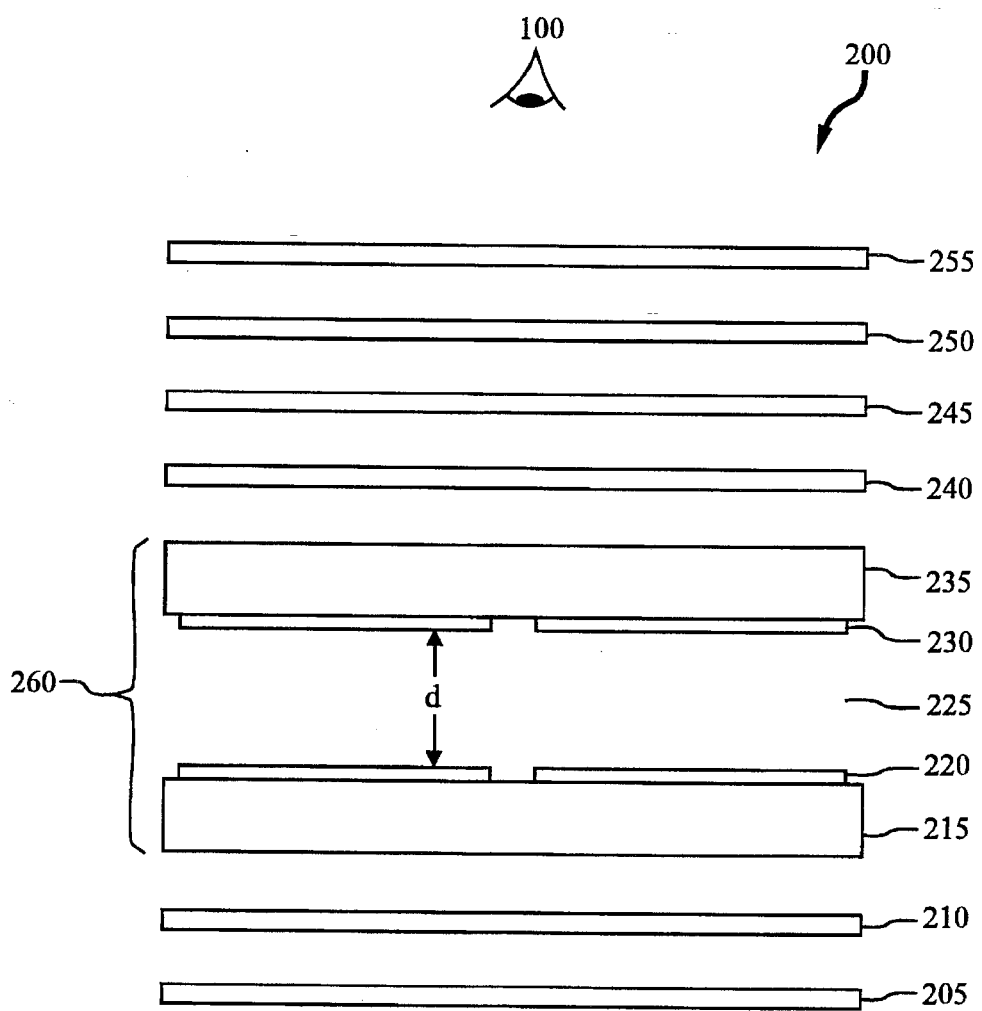
FIG. 2 shows a liquid crystal display in accordance with the invention that utilizes a single inorganic O-plate compensator layer.

FIG. 2 shows a region of a super-twisted nematic liquid crystal display 200 in accordance with the invention that includes a polarizer 205, a first negatively birefringent C-plate compensator layer 210, a first liquid crystal cell substrate 215 having on its surface a plurality of first electrodes 220, a liquid crystal layer 225, a second plurality of electrodes 230 on a surface of a second liquid crystal cell substrate 235, a second negatively birefringent C-plate compensator layer 240, a positively birefringent A-plate compensator layer 245, a positively birefringent O-plate compensator layer 250, and an analyzer 255. (A polarizer 205 and an analyzer 255 both polarize electromagnetic fields. Typically, however, the term 'polarizer' refers to a polarizer element that is closest the source of light while the term 'analyzer' refers to a polarizer element that is closest the viewer 100 of the LCD. ) The area between and including the substrates 215 and 235 is referred to as a liquid crystal cell 260. The physical thickness of the liquid crystal layer 225 is commonly referred to as the cell gap d of the cell.

Those of ordinary skill will recognize that the interior surfaces of the liquid crystal cell's substrates 215 and 235 include conventional alignment layers (not shown) at the interfaces between the substrates and the liquid crystal material 225. An alignment layer orients the liquid crystal material at the interface along a specific azimuthal direction, and with a small pretilt angle; useful surface pretilt angles range from about 1° to about 30°.

The liquid crystal layer 225 is composed of a liquid crystal material that has a positive dielectric anisotropy. The liquid crystal material sold by the Merck company under designation Merck ZLI-4431 has been found to be satisfactory in preliminary tests. Many other super-twist nematic liquid crystal materials are available commercially and may also be used.

The liquid crystal material includes a conventional chiral dopant of any convenient type in sufficient concentration to produce a left-handed twist and a conventional cell-gap-to-pitch ratio, d/p, of −0.55.

The aforementioned Merck liquid crystal material has a twist angle of about 240° and a surface pretilt angle of about 6° when used with the alignment layers of this embodiment. Useful twist angles are substantially greater than about 180° and less than about 270°; preferably ranging from about 220° to about 250°. The azimuthal orientation of the liquid crystal material at the first substrate 215 is about 30°; this orientation is selected to produce about a 270° azimuthal orientation of the liquid crystal director in the middle of the liquid crystal cell. A different orientation of the liquid crystal material at the substrate 215 would be used for a different twist angle in another implementation.

The liquid crystal layer 225 may have a thickness d of about 3.9 microns, producing a phase retardation ($\Delta$nd) for the liquid crystal cell of approximately 650 nm. Useful phase retardations will vary depending on the birefringence of the liquid crystal material selected for the display 200, as long as the total phase retardation of the liquid crystal layer 225 is between about 500 nm and about 850 nm.

The polarizer layer 205 has an azimuthal orientation of its absorption axis of 92°; the analyzer layer 255 has an azimuthal orientation of its absorption axis of 25°. The orientations of the polarizer layer 205, analyzer layer 255, and liquid crystal cell 260 are selected to produce a normally whim display. The exact orientations used can vary considerably from one implementation to another; depending upon the available materials and design goals. The specific orientations to be used in any particular implementation will be determined empirically as a matter of routine engineering by those of ordinary skill having the benefit of this disclosure.

The first negatively birefringent C-plate compensator layer 210 may have a phase retardation of 145 nm; useful phase retardation values are expected to range from about 70 nm to about 300 nm. The second negatively birefringent C-plate compensator layer 240 may have a phase retardation of 48 nm; useful phase retardation values are expected to range from about 30 nm to about 100 nm.

Both C-plate compensator layers 210 and 240 may have a birefringence of about 0.10 and may be fabricated using the process disclosed in Yeh et at., U.S. Pat. No. 5,196,953. It will be apparent to those of ordinary skill having the benefit of this disclosure that other methods exist for fabricating negatively birefringent C-plate compensators of this kind.

The positively birefringent A-plate compensator layer 245 may be of a conventional stretched-polymer-film type. The polymer film may have a phase retardation of about 98 nm. Useful retardation values are expected to range from about 80 nm to about 120 nm. The positively birefringent A-plate compensator layer 245 may have an azimuthal orientation of its extraordinary axis of about 92°; useful values of the azimuthal orientation are expected to range from about 80° to about 100°.

The extraordinary axis of the positively birefringent O-plate compensator layer 250 may have a tilt angle of about 39° and an azimuthal orientation of about 115°. Useful values of the tilt angle are expected to range from about 30° to about 50°. Useful values of the azimuthal orientation are expected to range from about 50° to about 130°.

The O-plate compensator layer 250 may be fabricated by oblique deposition of tantalum oxide on a substrate as disclosed in the co-pending U.S. patent application "Inorganic Thin Film Compensator For Improved Gray Scale Performance in Twisted Nematic Liquid Crystal Displays" by William J. Gunning, III, Bruce K. Winker, Donald B. Taber, Paul H. Kobrin, James C. Beedy, and John P. Eblen, Jr., filed contemporaneously and commonly assigned with this application. The thickness of the O-plate compensator layer may be about 0.51 microns, with useful thickness values being expected to range from about 0.4 microns to about 1.5 micron. The O-plate compensator layer is biaxial and may have principal refractive indices of 1.37, 1.52, nd 1.59, where the tilt angle of the O-plate is determined by the orientation of the major axis of the refractive index ellipsoid. Those of ordinary skill having the benefit of this disclosure will recognize that the exact refractive indices will vary with deposition angle and thickness.

5.2 Structure Of A Specific Embodiment Using Two Organic O-Plates

Figure 3:
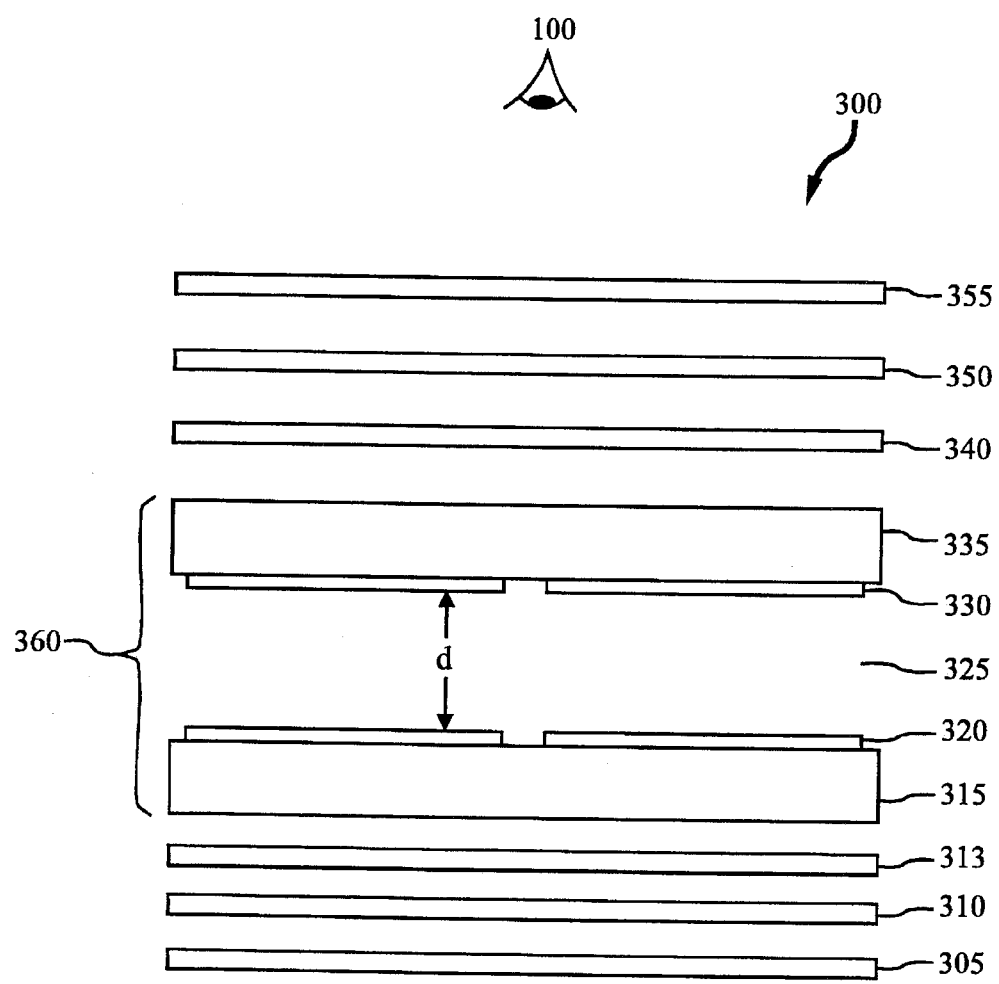
FIG. 3 shows a liquid crystal display in accordance with the invention that utilizes two organic O-plate compensator layers.

FIG. 3 shows a region of a super-twisted nematic liquid crystal display 300 in accordance with the invention that includes a polarizer 305, a first positively birefringent A-plate compensator layer 310, a first positively birefringent O-plate compensator layer 313, a first liquid crystal cell substrate 315 having on its surface a plurality of first electrodes 320, a liquid crystal layer 325, a second plurality of electrodes 330 on a surface of a second liquid crystal cell substrate 335, a second positively birefringent O-plate compensator layer 340, a second positively birefringent A-plate compensator layer 350, and an analyzer 355. The area between and including the substrates 315 and 335 is referred to as a liquid crystal call 360. The physical thickness of the liquid crystal layer 325 is commonly referred to as the cell gap d of the cell.

Those of ordinary skill will recognize that the interior surfaces of the liquid crystal cell's substrates 315 and 335 include conventional alignment layers (not shown) at the interfaces between the substrates and the liquid crystal material 325. An alignment layer orients the liquid crystal material at the interface along a specific azimuthal direction, and with a small pretilt angle; useful surface pretilt angles range from about 1° to about 30°.

The liquid crystal layer 325 is composed of a liquid crystal material that has a positive dielectric anisotropy. The liquid crystal material sold by the Merck company under designation Merck ZLI-4431 has been found to be satisfactory in preliminary tests. Many other super-twist nematic liquid crystal materials are available commercially and may also be used.

As before, the liquid crystal material includes a conventional chiral dopant of any convenient type in sufficient concentration to produce a left-handed twist and a conventional cell-gap-to-pitch ratio, d/p, of −0.55.

The aforementioned Merck liquid crystal material has a twist angle of about 240° and a surface pretilt angle of about 6°. Useful twist angles are substantially greater than about 180° and less than about 270°; preferably ranging from about 220° to about 250°. The azimuthal orientation of the liquid crystal material at the first substrate 315 is about 30°; this orientation is selected to produce about a 270° azimuthal orientation of the liquid crystal director in the middle of the liquid crystal cell. A different orientation of the liquid crystal material at the substrate 315 would be used for a different twist angle in another implementation.

The liquid crystal cell 360 may have a thickness d of about 4.5 microns, producing a phase retardation ($\Delta$nd) for the liquid crystal cell of approximately 740 nm. Useful phase retardations will vary depending on the birefringence of the liquid crystal material selected for the display 300, as long as the total phase retardation of the liquid crystal layer 325 is between about 500 nm and about 850 nm.

The polarizer layer 305 has an azimuthal orientation of its absorption axis of 149°; the analyzer layer 355 has an azimuthal orientation of its absorption axis of 43°. The orientations of the polarizer layer 305, analyzer layer 355, and liquid crystal cell 360 are selected to produce a normally whim display. The exact orientations used can vary considerably from one implementation to another; depending upon the available materials and the overall design goals. The specific orientations to be used in any particular implementation will be determined empirically as a matter of routine engineering by those of ordinary skill having the benefit of this disclosure.

The first positively birefringent A-plate compensator layer 310 may be of a conventional stretched-polymer-film type. The polymer film may have a phase retardation of about 56 nm. Useful retardation values are expected to range from about 45 nm to about 70 nm. The first positively birefringent A-plate compensator layer 310 may have an azimuthal orientation of its extraordinary axis of about 98°; useful values of the azimuthal orientation are expected to range from about 90° to about 110°.

The second positively birefringent A-plate compensator layer 350 may also be of a conventional stretched-polymer-film type. The polymer film may have a phase retardation of about 298 nm. Useful retardation values are expected to range from about 250 nm to about 350 nm. The second positively birefringent A-plate compensator layer 350 may have an azimuthal orientation of its extraordinary axis of about 74°; useful values of the azimuthal orientation are expected to range from about 65° to about 85°.

The extraordinary axis of the first positively birefringent O-plate compensator layer 313 may have a tilt angle of about 40° and an azimuthal orientation of about 64°. Useful values of the tilt angle are expected to range from about 30° to about 50°. Useful values of the azimuthal orientation are expected to range from about 55° to about 75°. The O-plate may have a phase retardation of about 307 nm. Useful retardation values are expected to range from about 260 nm to about 360 nm.

The extraordinary axis of the second positively birefringent O-plate compensator layer 340 may have a tilt angle of about 40° and an azimuthal orientation of about 29°. Useful values of the tilt angle are expected to range from about 30° to about 50°. Useful values of the azimuthal orientation are expected to range from about 20° to about 40°. The O-plate may have a phase retardation of about 143 nm. Useful retardation values are expected to range from about 120 nm to about 170 nm.

The O-plate compensator layers 313 and 340 may be fabricated by any of a variety of organic fabrication techniques as disclosed in the co-pending U.S. patent applications "Organic Photopolymer Compensation Film For Improved Gray Scale Performance in Twisted Nematic Liquid Crystal Displays" by Brace K. Winker and "Organic Polymer O-Plate Compensator For Improved Gray Scale Performance in Twisted Nematic Liquid Crystal Displays" by Brace K. Winker, Hong-Son Ryang, Leslie F. Warren, Jr., Charles Rosenblatt, and Zili Li, filed contemporaneously and commonly assigned with this application.

5.3 Variations

The embodiments shown in FIGS. 2 and 3 can be varied considerably. For example:

1. Additional compensation layers can be added. For instance, a combination of compensation layers including a negatively birefringent C-plate compensation layer, a positively birefringent O-plate compensation layer, and a positively birefringent A-plate compensation layer can be located on either or both sides of the liquid crystal cell.

2. The O-plate layer 250 is not necessarily located between the liquid crystal cell 260 and the analyzer layer 255; likewise, the A-plate compensator layer 245 is not necessarily located between the liquid crystal cell 260 and the analyzer layer 255. Both the O-plate layer 250 and the A-plate layer 245 can be located instead at a convenient position between the polarizer layer 205 and the analyzer layer 255.

3. The negatively birefringent C-plate compensator layer 240 can be omitted if desired. Conversely, additional negatively birefringent C-plate compensator layers may be included in the design.

4. The O-plates 313 and 340 are not necessarily located between the liquid crystal layer 325 and the A-plates 310 and 350. Both the O-plate layers 313 and 340, and the A-plates layers 310 and 350 can be located instead at a convenient position between the polarizer layer 305 and the analyzer layer 355.

5. A negatively birefringent A-plate can be used instead of a positively birefringent A-plate compensator layer.

Those of ordinary skill having the benefit of this disclosure will recognize that, in each of these alternative embodiments, the location, orientation, and phase retardation of each of the compensator layers must be routinely adjusted to optimize the viewing-angle properties of the liquid crystal display to suit the desired implementation.

5.4 Some Benefits of the Invention

Figure 4:
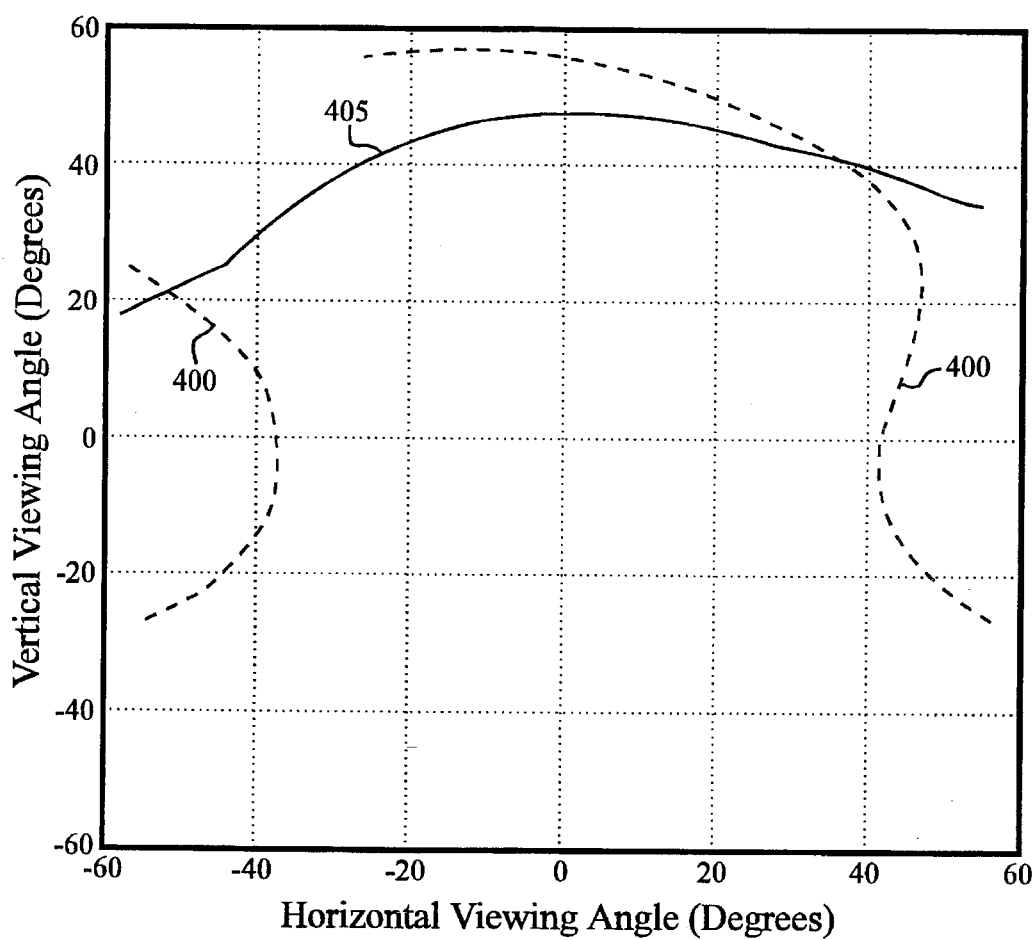
FIGS. 4 through 7 are isocontrast plots, generated by computer-modeling, comparing a display's uncompensated and compensated (i.e., the display of FIG. 2) viewing characteristics.
Figure 5:
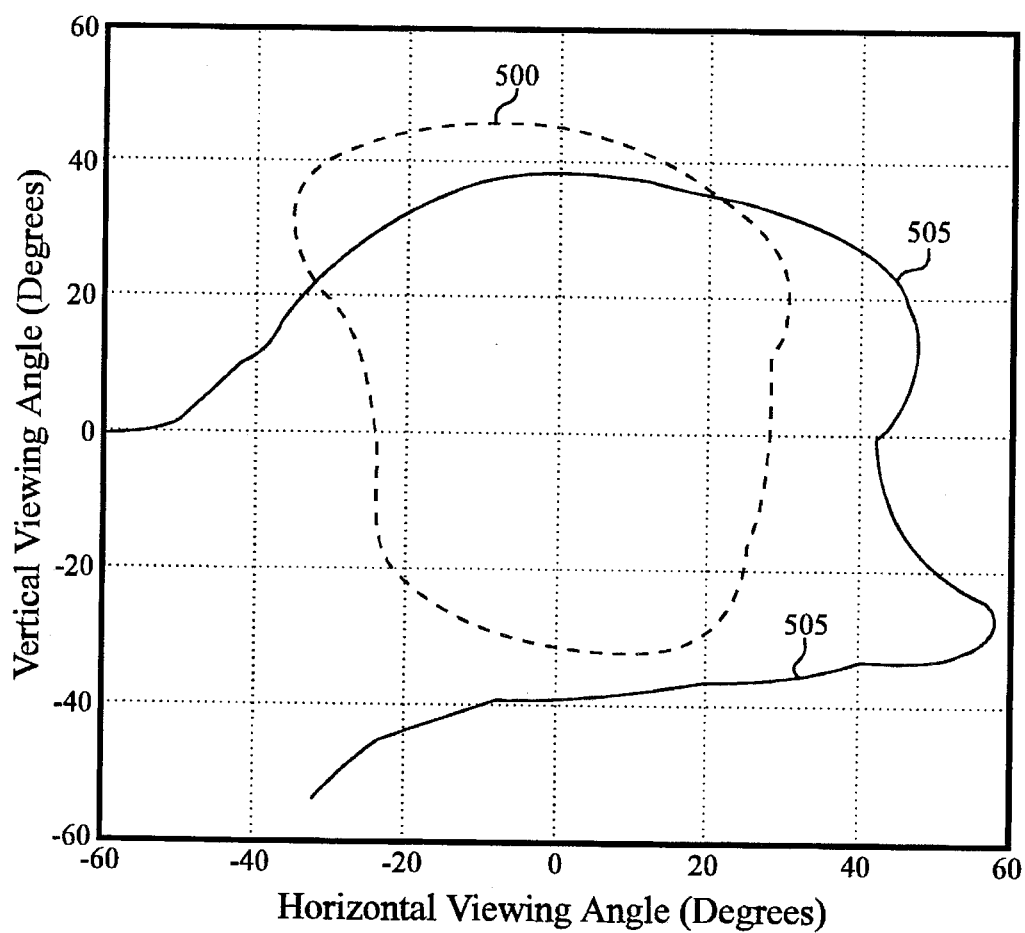
Figure 6:
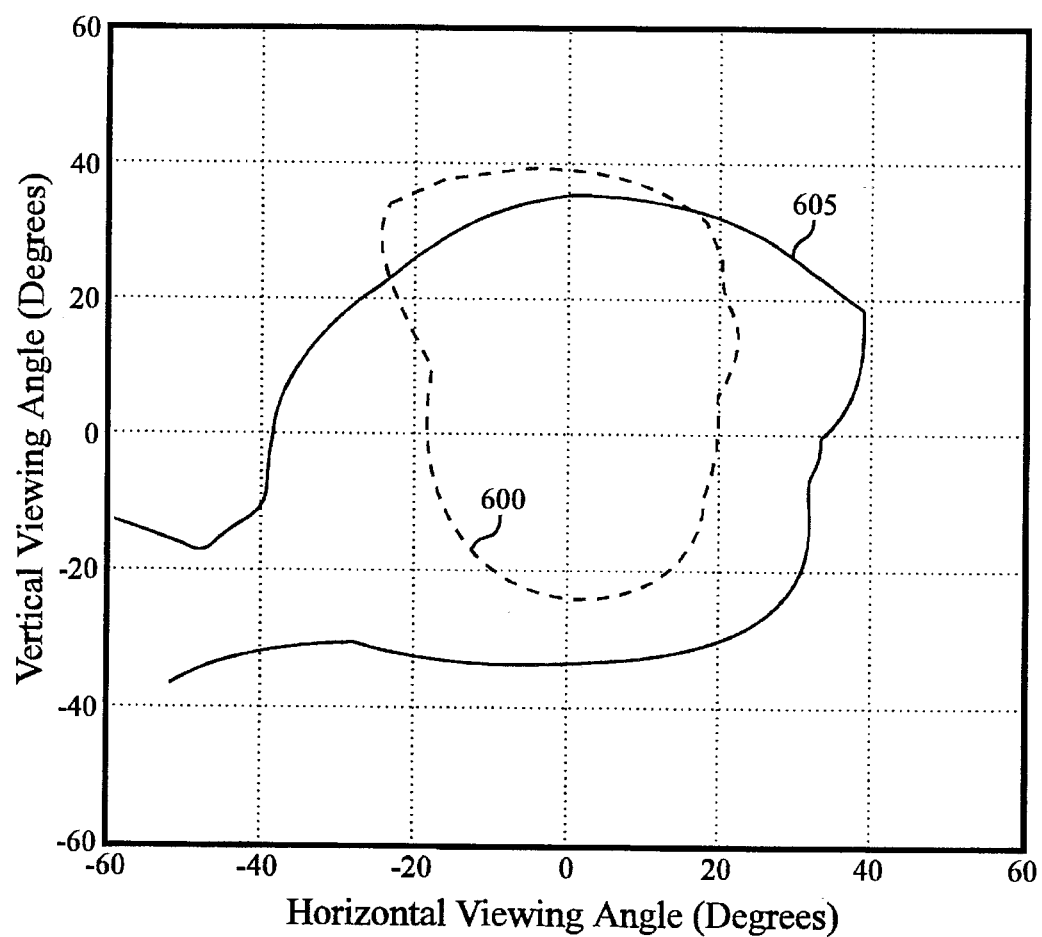
Figure 7:
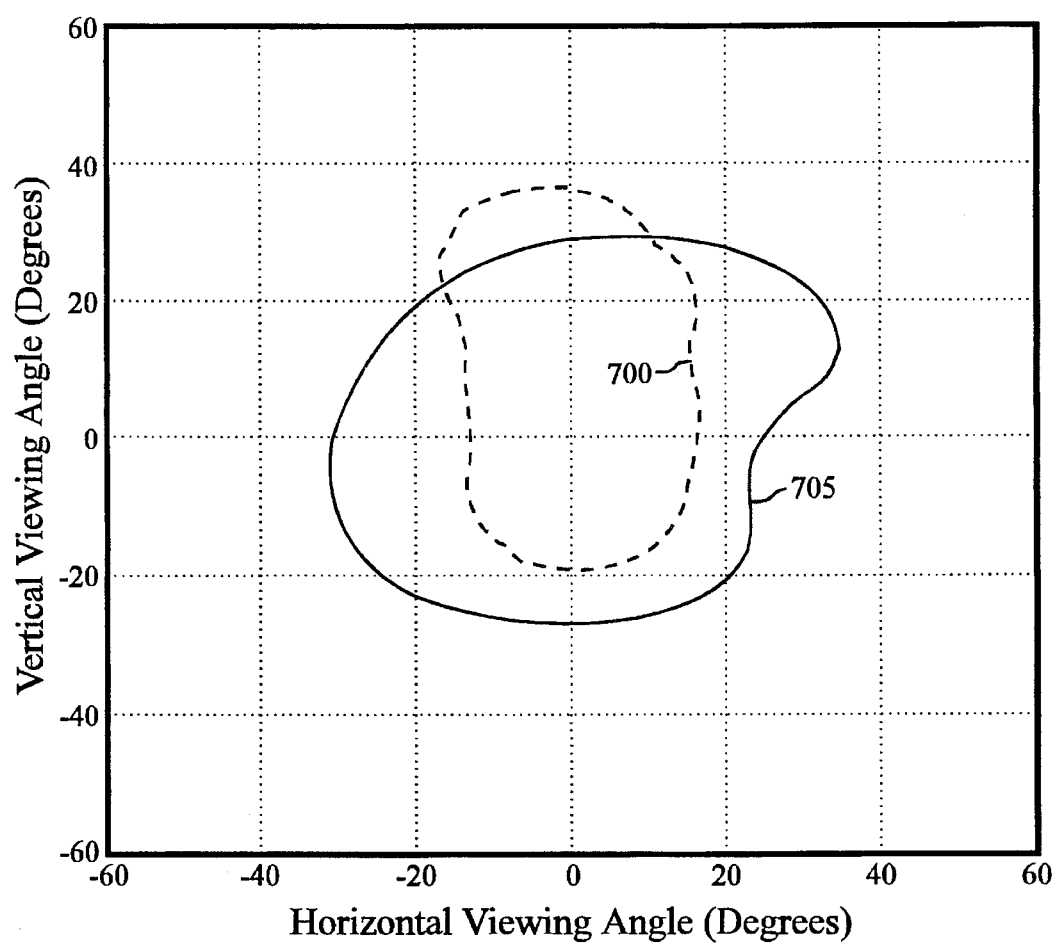

A principal benefit of the invention is that it dramatically expands the horizontal viewing angle over which high contrast is achieved in a super-twist nematic liquid crystal display, thus permitting greater use of the normally whim OMI and its attendant temperature-range benefits. For example, FIG. 4 shows "before" and "after" pictures generated by computer-modeling a hypothetical display (that of FIG. 2) that is uncompensated and that is compensated in accordance with the invention. More specifically, FIG. 4 is an isocontrast plot calculated at a wavelength of 550 nm for a 2:1 contrast ratio contour, i.e., a plot of contrast ratio as a surface contour vs. horizontal and vertical viewing angles, for the uncompensated 400 and compensated 405 display. FIGS. 5 through 7 show similar isocontrast plots for contrast ratios of 5:1 (uncompensated 500 and compensated 505), 10:1 (uncompensated 600 and compensated 605), and 20:1 (uncompensated 700 and compensated 705) respectively.

Figure 8:
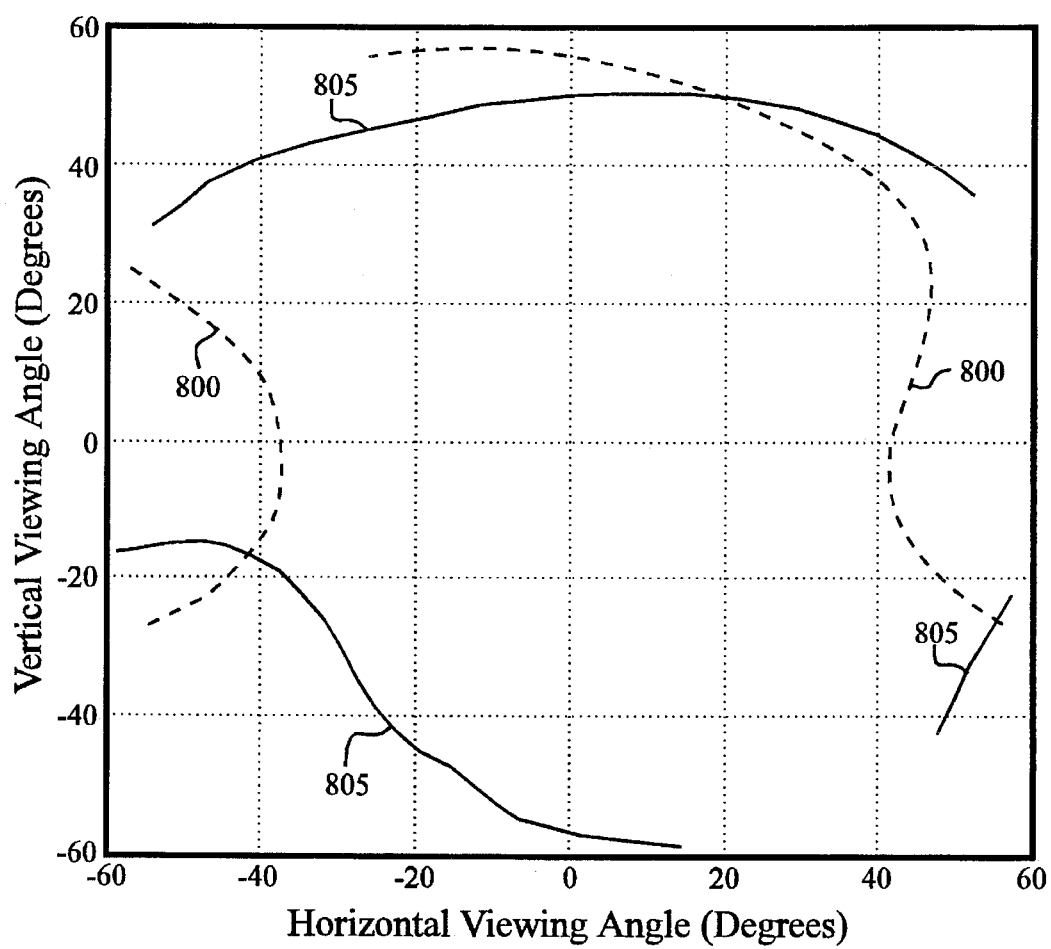
FIGS. 8 through 11 are isocontrast plots, generated by computer-modeling, comparing a display's uncompensated and compensated (i.e., the display of FIG. 3) viewing characteristics.
Figure 9:
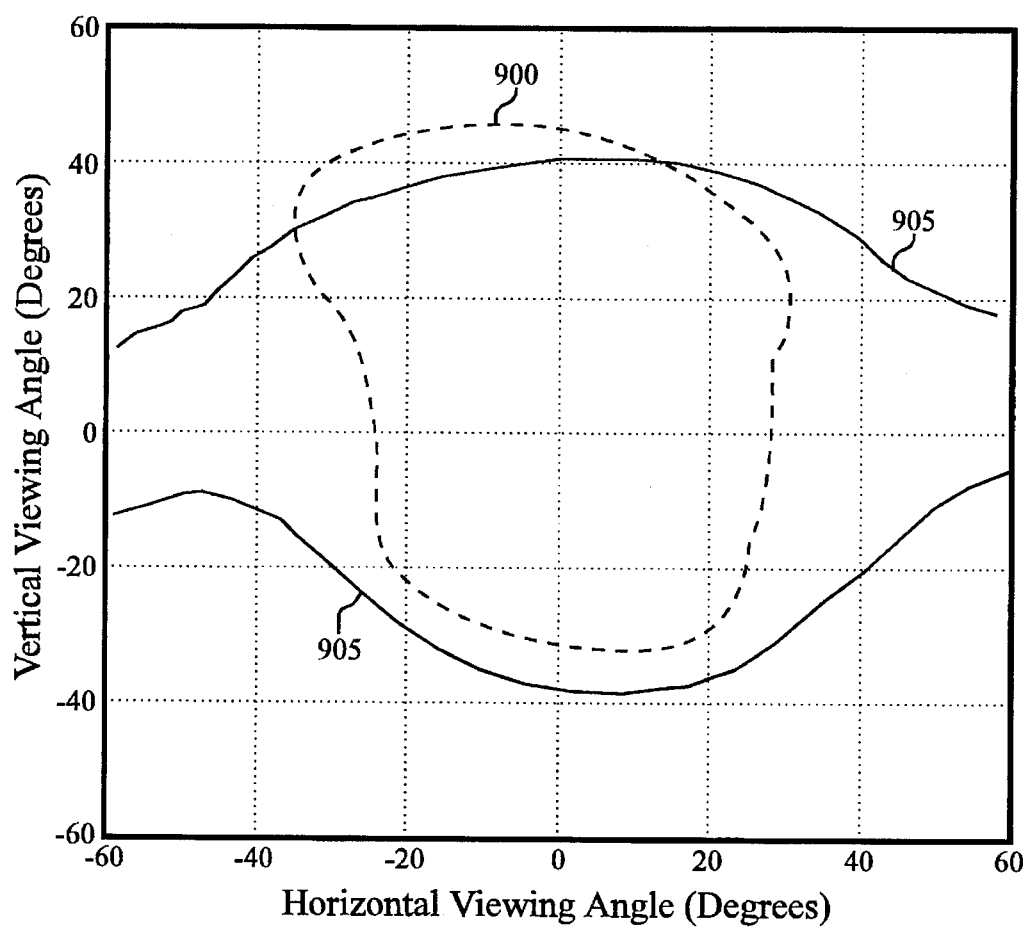
Figure 10:
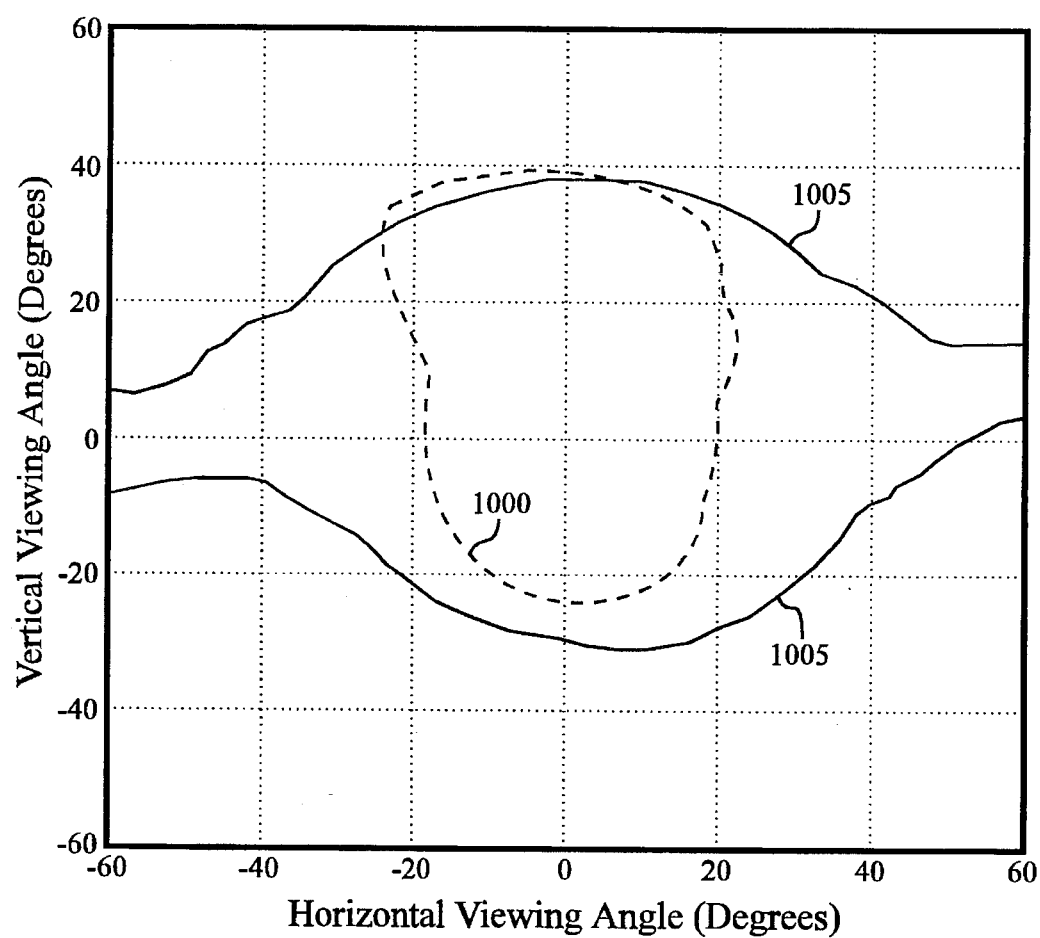
Figure 11:
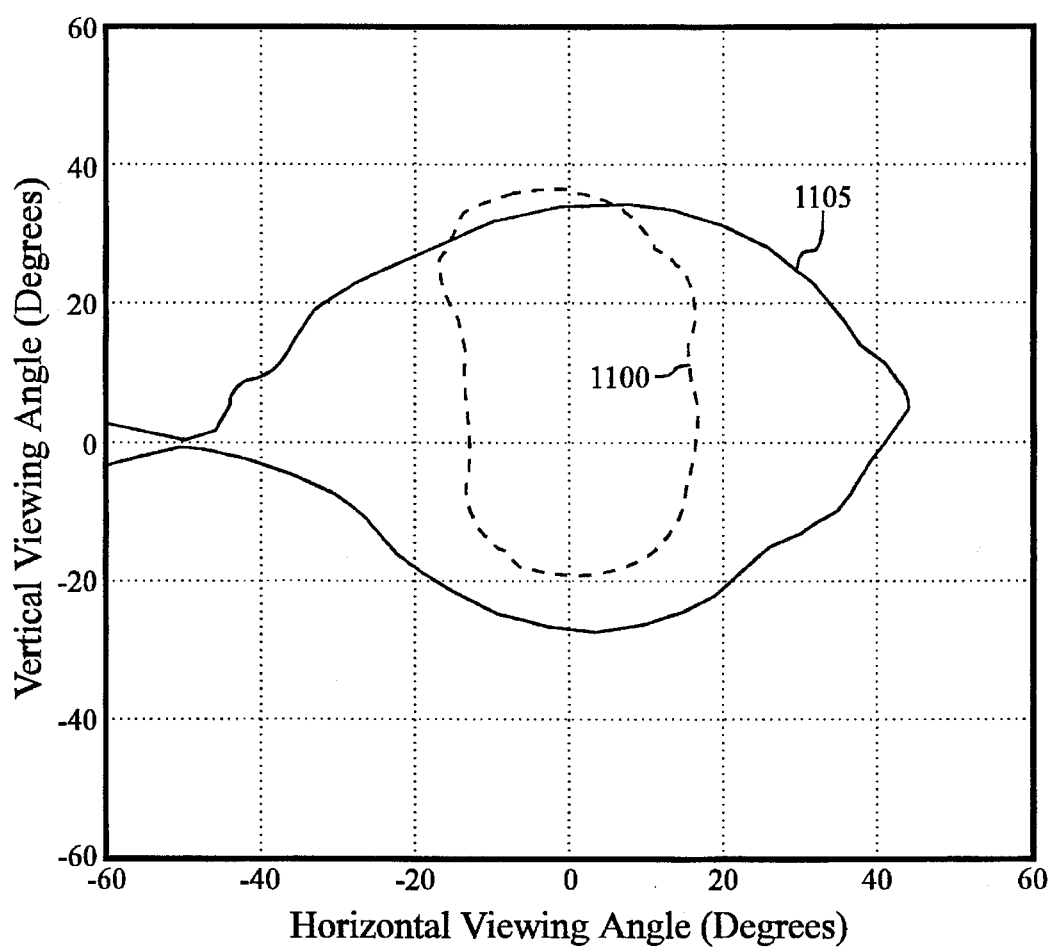

In another example, FIG. 8 shows "before" and "after" pictures generated by computer-modeling a hypothetical display (that of FIG. 3) that is uncompensated and that is compensated in accordance with the invention. More specifically, FIG. 8 is an isocontrast plot calculated at a wavelength of 550 nm for a 2:1 contrast ratio contour for the uncompensated 800 and compensated 805 display. FIGS. 9 through 11 show similar isocontrast plots for contrast ratios of 5:1 (uncompensated 900 and compensated 905), 10:1 (uncompensated 1000 and compensated 1005), and 20:1 (uncompensated 1100 and compensated 1105) respectively. Furthermore, the embodiment of FIG. 3 exhibits less variation in the whim state and black state chromaticity over a ±20° field of view and over a 65° temperature range (0° to 65° C.) than does an uncompensated OMI display.

It will be apparent to those of ordinary skill that the horizontal viewing angle for the compensated display is significantly improved over that of the uncompensated display for all of the contrast ratios. It is also believed that a compensated display in accordance with the invention provides considerably better range of horizontal viewing angles than prior art compensated super-twist nematic liquid crystal displays.

BIBLIOGRAPHY

1. Clerc et al., "Liquid Crystal Cell Which Can Have A Homeotropic Structure With Compensated Birefringence Of Said Structure," U.S. Pat. No. 4,701,028.
2. Moia, Schadt and Seiberle, "High-Contrast and High-Information-Content Optical-Mode-Interference (OMI) LCD with Video Response: Comparison with STN-LCDs," SID 93 Digest, Seattle, U.S.A., pp. 368–371, 1993.
3. Scheffer and Nehring, in "Liquid Crystals Applications and Uses," Vol. 1, B. Bahadur, ed., World Scientific, pp. 231–274, 1990.

Yeh, et al., "Compensator for Liquid Crystal Display, Having Two Types of Layers with Different Refractive Indices Alternating," U.S. Pat. No. 5,196,953.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. An improved normally white super-twist nematic liquid crystal display comprising:
   (a) a polarizer layer;
   (b) an analyzer layer;
   (c) a liquid crystal cell disposed between said polarizer layer and said analyzer layer, said liquid crystal cell having:
      (1) two substrates, and
      (2) a liquid crystal layer disposed between said two substrates, said liquid crystal layer comprising a plurality of cholesteric liquid crystal molecules, said molecules having an azimuthal twist angle between said substrates equal to about 240 degrees, said liquid crystal layer having a phase retardation of about 0.65 microns;
   (d) a first negatively-birefringent C-plate compensator layer disposed between said polarizer layer and said liquid crystal cell;
   (e) a positively-birefringent A-plate compensator layer disposed between said liquid crystal cell and said analyzer layer; and
   (f) a positively-birefringent O-plate compensator layer disposed between said liquid crystal cell and said analyzer layer.

2. The super-twist nematic liquid crystal display of claim 1, further comprising a second negatively-birefringent C-plate compensator layer disposed between said liquid crystal cell and said analyzer layer.

3. An improved normally white super-twist nematic liquid crystal display comprising:
   (a) a polarizer layer;
   (b) an analyzer layer;
   (c) a liquid crystal cell disposed between said polarizer layer and said analyzer layer, said liquid crystal cell having:
      (1) two substrates, and
      (2) a liquid crystal layer disposed between said two substrates, said liquid crystal layer comprising a plurality of cholesteric liquid crystal molecules, said molecules having an azimuthal twist angle between said substrates equal to about 240 degrees, said liquid crystal layer having a phase retardation of about 0.65 microns;
   (d) a first negatively-birefringent C-plate compensator layer disposed between said polarizer layer and said analyzer layer;
   (e) a positively-birefringent A-plate compensator layer disposed between said polarizer layer and said analyzer layer; and
   (f) a positively-birefringent O-plate compensator layer disposed between said polarizer layer and said analyzer layer.

4. The super-twist nematic liquid crystal display of claim 3, further comprising a second negatively-birefringent C-plate compensator layer disposed between said polarizer layer and said analyzer layer.

5. An improved normally white super-twist nematic liquid crystal display comprising:
   (a) a polarizer layer;
   (b) an analyzer layer;
   (c) a liquid crystal cell disposed between said polarizer layer and said analyzer layer, said liquid crystal cell having:
      (1) two substrates, and
      (2) a liquid crystal layer disposed between said two substrates, said liquid crystal layer comprising a plurality of cholesteric liquid crystal molecules, said molecules having an azimuthal twist angle between said substrates equal to about 240 degrees, said liquid crystal layer having a phase retardation of about 0.65 microns;
   (d) a first negatively-birefringent C-plate compensator layer disposed between said polarizer layer and said liquid crystal cell;
   (e) a first positively-birefringent A-plate compensator layer disposed between said polarizer layer and said liquid crystal cell;
   (f) a first positively-birefringent O-plate compensator layer disposed between said polarizer layer and said liquid crystal cell
   (g) a second negatively-birefringent C-plate compensator layer disposed between said liquid crystal cell and said analyzer layer;
   (h) a second positively-birefringent A-plate compensator layer disposed between said liquid crystal cell and said analyzer layer; and
   (i) a second positively-birefringent O-plate compensator layer disposed between said liquid crystal cell and said analyzer layer.

6. An improved normally white super-twist nematic liquid crystal display comprising:
   (a) a polarizer layer;
   (b) an analyzer layer;
   (c) a liquid crystal cell disposed between said polarizer layer and said analyzer layer, said liquid crystal cell having:
      (1) two substrates, and
      (2) a liquid crystal layer disposed between said two substrates, said liquid crystal layer comprising a plurality of cholesteric liquid crystal molecules, said molecules having an azimuthal twist angle between said substrates equal to about 240 degrees, said liquid crystal layer having a phase retardation of about 0.74 microns;
   (d) a first positively-birefringent O-plate compensator layer disposed between said polarizer layer and said liquid crystal cell;

(e) a first positively-birefringent A-plate compensator layer disposed between said polarizer layer and said liquid crystal cell;

(f) a second positively-birefringent A-plate compensator layer disposed between said liquid crystal cell and said analyzer layer; and (g) a second positively birefringent O-plate compensator layer disposed between said liquid crystal cell and said analyzer layer.

7. The normally white super-twist nematic liquid crystal display of claim 6, further comprising:

(a) a first negatively birefringent C-plate compensator layer disposed between said polarizer layer and said liquid crystal layer; and (b) a second negatively birefringent C-plate compensator layer disposed between said liquid crystal layer and said analyzer layer.

8. An improved normally white super-twist nematic liquid crystal display comprising:

(a) a polarizer layer;

(b) an analyzer layer;

(c) a liquid crystal cell disposed between said polarizer layer and said analyzer layer, said liquid crystal cell having:

(1) two substrates, and (2) a liquid crystal layer disposed between said two substrates, said liquid crystal layer comprising a plurality of cholesteric liquid crystal molecules, said molecules having an azimuthal twist angle between said substrates equal to about 240 degrees, said liquid crystal layer having a phase retardation of about 0.65 microns; and (d) a positively-birefringent O-plate compensator layer having an optical axis defined by a tilt angle, said tilt angle measured relative to the plane of the O-plate compensator layer, said O-plate compensator layer disposed between said polarizer layer and said analyzer layer, wherein said tilt angle is a specified value between approximately 30 degrees and approximately 50 degrees.

9. An improved super-twist nematic liquid crystal display comprising:

(a) a polarizer layer;

(b) an analyzer layer;

(c) a liquid crystal cell disposed between said polarizer layer and said analyzer layer, said liquid crystal cell having:

(1) two substrates, and (2) a liquid crystal layer disposed between said two substrates, said liquid crystal layer comprising a plurality of cholesteric liquid crystal molecules, said molecules having an azimuthal twist angle between said substrates of substantially greater than about 180 degrees; and (d) a positively-birefringent O-plate compensator layer having an optical axis defined by a tilt angle, said tilt angle measured relative to the plane of the O-plate compensator layer, said O-plate compensator layer disposed between said polarizer layer and said analyzer layer, wherein said tilt angle is a specified value between approximately 30 degrees and approximately 50 degrees.

10. The super-twist nematic liquid crystal display of claim 9, wherein said twist angle is greater than or equal to about 220 degrees and less than or equal to about 250 degrees.

11. The super-twist nematic liquid crystal display of claim 9, wherein said twist angle is equal to about 240 degrees.

12. The super-twist nematic liquid crystal display of claim 9, wherein said liquid crystal layer has a phase retardation of between about 0.55 and 0.7 microns.

13. The super-twist nematic liquid crystal display of claim 9, wherein said liquid crystal layer has a phase retardation of about 0.65 microns.

14. The super-twist nematic liquid crystal display of claim 9, wherein said liquid crystal layer has a phase retardation of about 0.74 microns.

15. The super-twist nematic liquid crystal display of claim 9, further comprising an A-plate compensator layer disposed between said polarizer layer and said analyzer layer.

16. The super-twist nematic liquid crystal display of claim 9, further comprising a C-plate compensator layer disposed between said polarizer layer and said analyzer layer.

* * * * *